(12) United States Patent
Sainio et al.

(10) Patent No.: US 10,233,513 B2
(45) Date of Patent: Mar. 19, 2019

(54) METHOD FOR PURIFICATION OF A COBALT CONTAINING SOLUTION BY CONTINUOUS ION EXCHANGE

(71) Applicant: Norilsk Nickel Harjavalta Oy, Harjavalta (FI)

(72) Inventors: Tuomo Sainio, Lappeenranta (FI); Ilkka Suppula, Lappeenranta (FI)

(73) Assignee: Norilsk Nickel Harjavalta Oy, Harjavalta (FI)

( * ) Notice: Subject to any disclaimer, the term of this patent is extended or adjusted under 35 U.S.C. 154(b) by 589 days.

(21) Appl. No.: 14/742,001

(22) Filed: Jun. 17, 2015

(65) Prior Publication Data

US 2015/0361524 A1 Dec. 17, 2015

(30) Foreign Application Priority Data

Jun. 17, 2014 (FI) .................................... 20145572

(51) Int. Cl.
| | | |
|---|---|---|
| *C22B 3/42* | (2006.01) | |
| *C01G 51/00* | (2006.01) | |
| *C01G 51/10* | (2006.01) | |
| *B01D 15/18* | (2006.01) | |
| *B01D 15/36* | (2006.01) | |

(52) U.S. Cl.
CPC .............. *C22B 3/42* (2013.01); *B01D 15/185* (2013.01); *B01D 15/362* (2013.01); *C01G 51/003* (2013.01); *C01G 51/10* (2013.01); *Y02P 10/234* (2015.11); *Y02P 20/133* (2015.11)

(58) Field of Classification Search
CPC ....................................................... C22B 3/42
See application file for complete search history.

(56) References Cited

U.S. PATENT DOCUMENTS

| | | |
|---|---|---|
| 4,182,633 A | 1/1980 | Ishikawa et al. |
| 4,412,866 A | 11/1983 | Schoenrock et al. |
| 5,064,539 A | 11/1991 | Tanimura et al. |
| 5,102,553 A | 4/1992 | Kearney et al. |
| 2008/0093302 A1 | 4/2008 | Kearney et al. |
| 2010/0326918 A1 | 12/2010 | Theoleyre |

FOREIGN PATENT DOCUMENTS

| | | |
|---|---|---|
| FR | 2462924 A1 | 2/1981 |
| WO | 2011/100442 | 8/2011 |
| WO | 2011100442 A1 | 8/2011 |
| WO | 2013/165735 | 11/2013 |
| WO | 2013165735 A1 | 11/2013 |

OTHER PUBLICATIONS

Alexandratos et al., "Synthesis and Characterization of Bifunctional Phosphinic Acid Resins," Macromolecules, May 1985, 18(5):829.

(Continued)

*Primary Examiner* — Melissa S Swain
(74) *Attorney, Agent, or Firm* — Andrus Intellectual Property Law, LLP

(57) ABSTRACT

Methods are for purification of a cobalt containing solution from impurity metals by processing the feed solution through a continuous counter-current ion exchange process comprising of several beds containing cationic ion exchange material arranged in interconnectable zones 1, 2, 3-N in a simulated moving bed arrangement.

16 Claims, 8 Drawing Sheets

(56) References Cited

OTHER PUBLICATIONS

Bailey et al., "Removal of Nickel from Cobalt Sulfate Electrolyte Using ISEPTM Continuous Ion Exchange," Proceedings of Copper, Cobalt, Nickel and Zinc Recovery, International Conference, Victoria Falls, Zimbabwe, Jul. 16-18, 2001, SAIMM, Johannesburg.
Kaspereit, "Advanced Operating Concepts for SMB Processes," Advances in Chromatography: E. Grushka, N. Grinberg, CRC Press, 2009:165-192.
Search Report in Finnish Patent No. 20145572 dated Jan. 22, 2015.
Search Report in European Patent No. 15172618.9 dated Nov. 19, 2015.
Virolainen et al., Hydrometallurgy, vol. 142, 2014, p. 84-93.
Wikipedia: Simulated Moving Bed [retrieved Jan. 16, 2015].
Rossiter, G.J., Advances in Mineral Processing Plant Design, Jan. 1, 2009, pp. 258-267.
Anonymous: "Product Information Lewatit TP 260"; Dec. 9, 2011, retrieved on Nov. 16, 2015.
Virolainen et al., Continuous ion exchange for hydrometallurgy: Purification of Ag(I)—NaCl from divalent metals with aminomethylphosphonic resin using counter-current and cross-current operation, Hydrometallurgy, vol. 142, 2014, p. 84-93.
Wikipedia: Simulated Moving Bed [retriebed Jan. 16, 2015] http://en.wikipedia.org/wiki/Simulated_moving_bed, 4 pgs.
Finnish Patent and Registration Office Search Report, dated Jan. 22, 2015.

METHOD FOR PURIFICATION OF A COBALT CONTAINING SOLUTION BY CONTINUOUS ION EXCHANGE

CROSS-REFERENCE TO RELATED APPLICATION

This application claims priority to Finnish Patent Application No. 20145572, filed Jun. 17, 2014, which is incorporated herein by reference, in entirety.

TECHNICAL FIELD

This invention relates to the continuous purification of cobalt containing hydrometallurgical process solutions by ion exchange

BACKGROUND OF THE INVENTION

Continuous ion exchange (CIX) processes have been previously presented for recovery rather than purification of cobalt from hydrometallurgical process solution, described for example in WO 2011/100442 and WO 2013/165735. These inventions depict a continuous cross current/partial counter current ion exchange procedure such as described in Bailey et al., Removal of Nickel from Cobalt Sulfate Electrolyte Using ISEPTM Continuous Ion Exchange; in Proceedings of Copper, Cobalt, Nickel and Zinc recovery, International conference, Victoria Falls, Zimbabwe, 16-18 Jul. 2001, SAIMM, Johannesburg. The requirements for cobalt recovery in the aforementioned inventions are in general:
(i) The ion exchange material used has high affinity and sufficient capacity for cobalt.
(ii) Cobalt concentration in the hydrometallurgical process solution treated is low, in the examples presented in the aforementioned inventions preferably less than 0.5 g/L.

The present invention pertains to purification rather than recovery of concentrated cobalt sulfate hydrometallurgical process solutions containing cobalt from 10 g/L to saturated solution. The ion exchange materials presented in the aforementioned inventions, specifically bis-2-(pyridylmethyl) amine (also known as bis-picolylamine) functionalized ion exchange resins, are incapable of recovering cobalt from solutions of significantly high Co concentration (see reference example 3).

The method described in the present invention uses counter current simulated moving bed (SMB) continuous ion exchange (CIX) in a thus far unutilized arrangement to purify cobalt from impurity metals. SMB chromatography has been used to separate acid and metals from a hydrometallurgical process solution (US 2008/0093302) in the traditional SMB arrangement. Briefly, in such an SMB process the stronger adsorbing components are carried by the solid phase (ion exchange resin) counter current to the less adsorbing components carried downstream by the liquid and collected in their respective outlets either upstream or downstream from the feed port. Examples of fully continuous SMB processes where each step is identical can be found in U.S. Pat. No. 4,182,633 and U.S. Pat. No. 4,412,866. Time variable or non-identical step SMB processes are described for example in U.S. Pat. No. 5,064,539 and U.S. Pat. No. 5,102,553. SMB may also be operated semi-continuously or sequentially as described for example in U.S. Pat. No. 5,127,957.

In relation to previously published cobalt recovery and purification from sulfate solutions using continuous ion exchange the novelty of the present invention pertains to:
1) Treating solutions where cobalt is the primary component, present in concentrations from 10 g/L to saturated solution.
2) Using continuous ion exchange in simulated moving bed in a manner not previously published for cobalt recovery and purification, specifically eluting the target metal with mineral acid to produce a Co rich front to raffinate, while impurities are adsorbed to the resin of a bed, transported counter-current to the Co-solution being treated, and then desorbed from the resin of said bed in a separate zone upstream from the bed into which present Co containing feed solution is fed.
3) Generally combining features of counter current SMB chromatography, known mainly in pharmaceuticals and sweeteners production and also described for acid/metal separation in US 2008/0093302, with cross current open circuit continuous ion exchange such as described in WO 2011/100442 and WO 2013/165735, in recovery and separation of metals from impurity metals from hydrometallurgical process solutions.

Metals recovery by sequential multi-column ion exchange system has also been presented in US 2010/0326918. The invention presented therein pertains to ionic metal complexes of for example Co that may be either the most retained or the least retained component by the ion exchange material. The process described in US 2010/0326918 functions by cross current zones and does not feature a counter current elution such as depicted in the present invention. Further no examples to cobalt purification are presented in the aforementioned invention.

SUMMARY OF THE INVENTION

The invention relates to a method for purification of a cobalt containing feed solution from impurity metals.

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

The subject of the present invention is to use counter current continuous ion exchange (CIX) in simulated moving bed (SMB) to purify a concentrated cobalt containing solution, preferably cobalt sulfate solution from impurity metals. The impurity metals to be extracted from cobalt containing feed solution comprise at least one or more of the following: Cd, Mn, Mg, Pb, Cu, Zn, U, Ca, Fe, Ni, Cr, Na, and/or Al.

Present invention concerns a method for purification of a cobalt containing solution from impurity metals by processing the feed solution through a continuous counter-current ion exchange process comprising of several beds containing cationic ion exchange material arranged in interconnectable zones 1, 2, 3-N in a simulated moving bed arrangement. The method comprising at least the following steps:
(a) introducing a desorbent solution, which has sufficiently low pH that impurity metals are desorbed into one or more beds of the first, regeneration zone and collecting an extract containing impurity metals from the same bed and/or from another bed downstream within the said first, regeneration zone, (b) introducing a wash solution of pH higher than the desorbent solution into one or more of said beds of the regeneration zone and collecting an extract containing impurity metals and desorbent from the said bed and/or from another bed downstream within the first, regeneration zone,
(c) introducing an aqueous eluent with pH sufficiently low to desorb Co but sufficiently high not to desorb impurity metals into a zone consisting of one or more beds subsequent to said regeneration zone,
(d) introducing the cobalt containing feed solution which has pH sufficiently high to adsorb impurity metals but sufficiently low to avoid adsorbing Co into one or more beds of the next zone downstream from the zone of step (c) and collecting a cobalt product raffinate solution from the said bed and/or from another bed downstream,
wherein the positions where the cobalt containing feed, eluent, desorbent, and wash solution are introduced and where the impurity metals containing extract, spent wash solution, and cobalt containing raffinate are collected are changed to adjacent beds downstream to simulate the counter-current flow of the solid and liquid phases after such periods of time that cobalt propagates downstream with fluid phase in zones II and III, impurity metals propagate upstream with the simulated flow of the solid phase in zones II and III, impurity metals are desorbed in zone I, and the desorbent is washed from the resin in zone I.

Beds mean herein vessels called columns containing ion exchange media, preferably as a packed bed. Beds contain ion exchange media which are provided by a series of fluid connected columns (interconnected columns), wherein each column contains ion exchange resin.

SMB arrangement means herein a number of columns connected through a valve system such that liquid can be introduced into any of the columns, liquid exiting any of the columns can be passed into another column or withdrawn from the system, and where the position of the liquid inlets and outlets can be changed. Counter-current SMB operation means that that the stronger adsorbing impurity components (impurity metals) are carried by the ion exchange resin counter current to the feed solution which contains also less adsorbing cobalt metal. Impurity components and cobalt are collected respectively either upstream or downstream from the bed in which Co rich feed solution is fed.

In a preferred embodiment of the invention the SMB process is achieved by a series of valves managed preferably by a microprocessor to create a simulated counter current flow of solid and liquid phases by periodically switching the inlet and outlet ports by one column increment in the direction of the liquid flow. The same counter current operation is achieved if the columns are moved periodically by one increment in the direction opposite to the liquid flow.

The SMB process arrangement is controlled by a series of valves managed preferably by a microprocessor to create a simulated counter current flow of solid and liquid phases by periodically switching the inlet and outlet ports. Additionally simulated moving bed arrangement may include feed tanks, pumps, piping, valves, instrumentation and process control In a preferred method the concentration of cobalt in the cobalt containing feed solution is from 10 g/L to a saturated solution, preferably 70-120 g/L. Preferably cobalt exists as a cobalt sulfate.

In another preferred method eluent is a solution of an inorganic acid with pH in the range 2.0 to 0, preferably in the range 1.5-0.

Preferably the wash solution contains inorganic acid with pH same or below that of the feed solution.

Each zone includes 1-4 interconnected beds preferably 2-3 interconnected beds.

In an advantageous method of the present invention, zone between regeneration zone and cobalt containing feed is omitted and the method comprises the following steps:
(a) introducing a desorbent solution, which has sufficiently low pH that impurity metals are desorbed, into one or more beds of the first, regeneration zone and collecting an extract containing impurity metals from the same bed and/or from another bed downstream within the said regeneration zone,
(b) introducing a wash solution of pH higher than the desorbent solution into one or more of said beds of the regeneration zone and collecting an extract containing impurity metals and desorbent from the said bed and/or from another beds downstream within the regeneration zone,
(c) introducing a cobalt containing part of the extract of stage (b) into the feed solution of stage (d),
(d) introducing the cobalt containing feed solution, which has pH sufficiently high to adsorb impurity metals but sufficiently low to avoid adsorbing Co, into one or more beds of zone downstream to said regeneration zone, and collecting a cobalt product raffinate solution from the said bed and/or from another beds downstream
wherein the positions where the cobalt containing feed, eluent, desorbent, and wash solution are introduced and where the impurity metals containing extract, spent wash solution, and cobalt containing raffinate are collected are changed to adjacent beds downstream to simulate the counter-current flow of the solid and liquid phases after such periods of time that cobalt propagates downstream with fluid phase in zone downstream to said regeneration zone, impurity metals propagate upstream with the simulated flow of the solid phase either in zone downstream to regeneration zone or into regeneration zone, impurity metals are desorbed in regeneration phase and the desorbent is washed from the resin in regeneration phase.

In the present invention a method was discovered to apply SMB CIX process to purify a difficult to separate solution of high Co concentration. Unlike in the aforementioned cobalt sulfate recovery by CIX inventions (WO 2011/100442, WO 2013/165735) the target metal is being rejected by the separation material by optimal adjustment of solution pH and flow parameters and thus carried downstream by the eluent as a less adsorbing component. The impurity metals adsorb stronger in the separation material and are carried by the solid phase to a separate zone for desorption and separation material regeneration.

The separation material used in the present invention is a cation exchange resin. The cation exchange resin may be weakly acidic or strongly acidic and it may be non-chelating or chelating resin. Strongly acidic resins may contain but are not limited to sulphonic acid (e.g. Amberlyst 15, Finex CS16GC) or sulphonic acid and a weak acid (e.g. Purolite S957), weakly acidic resins may contain but are not limited to acrylic acid (e.g. Lewatit CNP C, Wofatit CA20) or methacrylic acid (e.g. Indion 464), chelating resins may contain but are not limited to iminodiacetic acid (e.g. Amberlite IRC748, Lewatit TP-207, Chelex 100, Purolite S930/4888, WP-2), (aminomethyl)phosphonic acid (e.g. Lewatit TP-260), (aminomethyl)phosphonic acid (Alexandratos et al., Macromolecules 18(1985), 835-840), or di(2-ethylhexyl)phosphoric acid (e.g. Lewatit OC-1026). The ion exchange resin used in the exemplary embodiment of this invention is a weakly acidic cation exchange resin with chelating (aminomethyl)phosphonic acid functionality and is commercially available as Lewatit TP-260 from Lanxess AG.

DETAILED DESCRIPTION

In the exemplary embodiment of the invention a method is provided wherein a feed solution containing higher than 10 g/L of Co is provided into a simulated moving bed system, comprising of one or more beds containing ion exchange media, together with an aqueous eluent solution of pH below the feed solution and a desorbent of strong acid and producing at least a first product stream and a second product stream. Beds containing ion exchange media are provided by a series of columns containing ion exchange resin. It will be known to one skilled in the art that the process of simulated moving bed by a system of feed tanks, pumps, piping, valves, instrumentation and process control can be realized in different ways and should not be limited to the embodiment of this invention.

Figure 1:
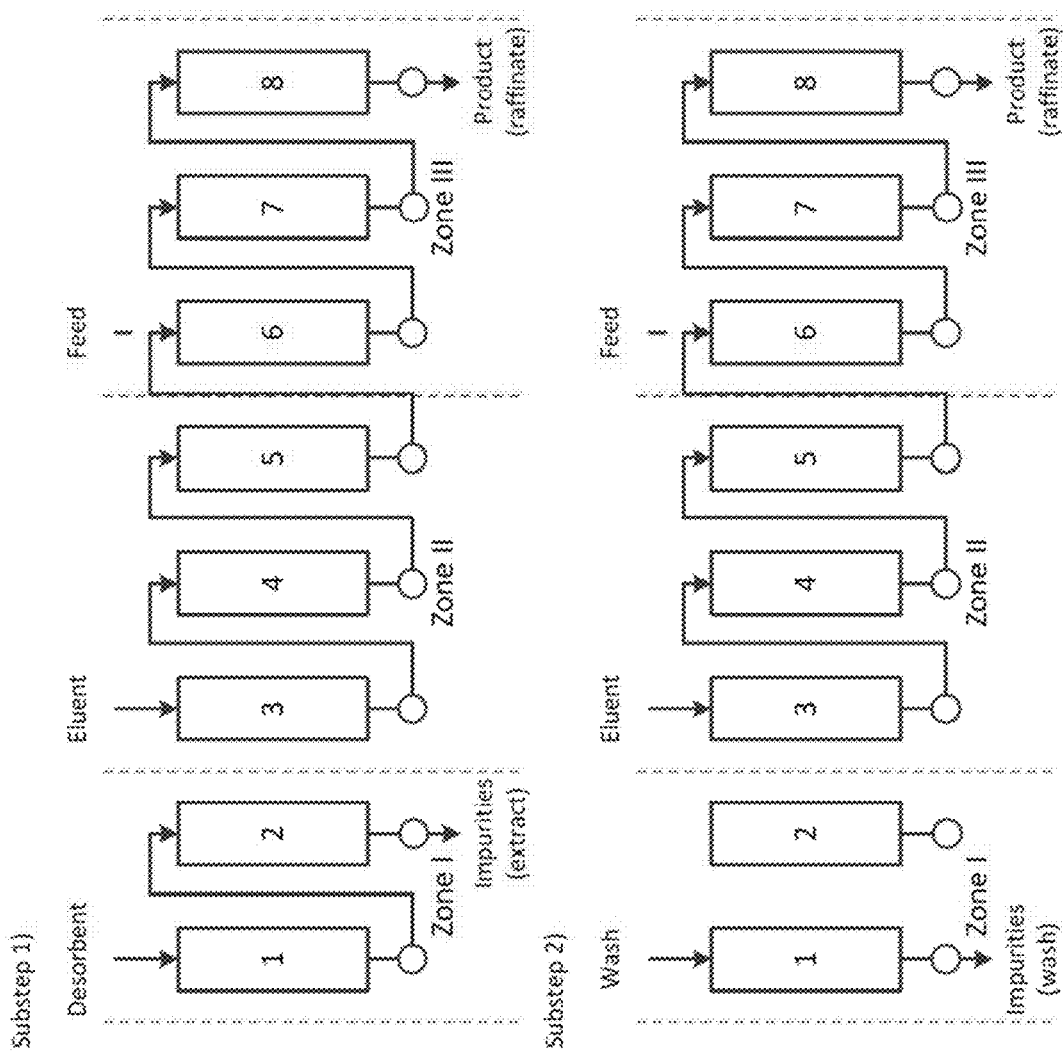
FIG. 1 illustrates an exemplary embodiment of the SMB-process according to the invention.

In an embodiment of the invention provided here as an example the process operating steps in a system of 8 columns are as shown in FIG. 1. These columns are arranged in three successive zones I, II and III. First zone or regeneration zone (denoted by zone I in FIG. 1), includes two interconnected columns (columns 1 and 2). Zone II, subsequent to said regeneration zone downstream, includes three interconnected columns (columns 3, 4 and 5). Zone III in which raffinate is collected, includes three interconnected columns (columns 6, 7 and 8) downstream from zone II.

The SMB process is achieved by a series of valves managed preferably by a microprocessor to create a simulated counter current flow of solid and liquid phases by periodically switching the inlet and outlet ports by one column increment in the direction of the liquid flow. The same counter current operation is achieved if the columns are moved periodically by one increment in the direction opposite to the liquid flow. The switching interval and internal flow parameters can be optimized by one skilled in the art for particular needs of the feed solution and target purities.

In zone III in FIG. 1 the impurity metals will be adsorbed in the ion exchange resin while cobalt is rejected and carried downstream to raffinate by the eluent fluid flow. A zone II of one or more columns, in the exemplary embodiment three columns, is provided upstream of the feed position between zones I (regeneration zone) and III to reject Co from entering the impurity metals desorption zone I and thus keeping cobalt yield close to 100% with optimized pH of the eluent lower than pH of the feed solution and typically from pH 2.0 to 0 adjusted preferably with $H_2SO_4$ but in principle any inorganic acid (such as HCl, $H_2SO_4$, $H_3PO_4$ and $HNO_3$). Preferably eluent pH is below 1.5 for optimal results.

The impurities including, but not limited to, any of the following: Cd, Mn, Mg, Pb, Cu, Zn, U, Ca, Fe, Ni, Cr, Na, and/or Al, are separated from Co in zones II and III and removed from the ion exchange resin in a separate regeneration zone or Zone I using a desorbent solution of inorganic acid with proton concentration below 6.0 M, preferably below 4.5 M. Preferably inorganic acid is $H_2SO_4$. The resin is also washed with water adjusted with inorganic acid in the same pH, or below as the feed solution. In the example provided the impurities are desorbed and the resin washed in the same zone I (FIG. 1) in different substeps 1) and 2) to avoid the need for an additional fifth zone.

In an alternative embodiment of the present invention the zone II can be omitted and instead part of the extract from impurities desorption in zone I that contains Co can be recycled by the use of a timed valve to the feed solution or even to process stages prior to the SMB CIX purification depicted in this invention.

While the feed is being eluted in zone III the cobalt concentration is diluted. The dilution of the product collected as raffinate can be reduced by addition of a zone of one or more columns downstream of the raffinate collection port or collecting the dilute portion of the raffinate separately by use of a timed valve (M. Kaspereit—Advanced operating concepts for SMB processes. In: E. Grushka, N. Grinberg (Eds.): Advances in Chromatography, CRC Press, 2009 (p. 165-192)).

Figure 2:
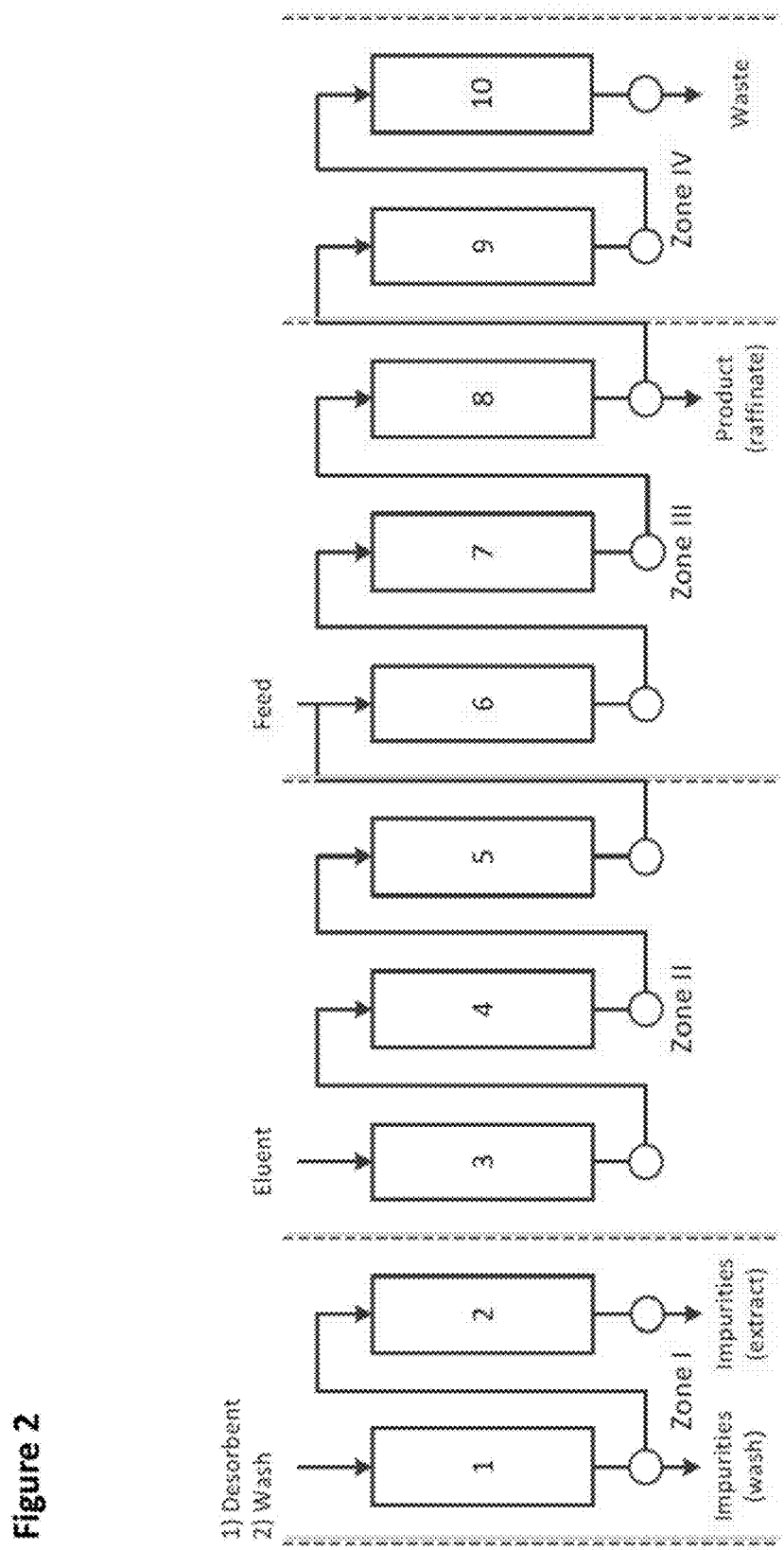
FIG. 2 illustrates an exemplary embodiment of the SMB-process according to the invention.

In an embodiment of the invention depicted in FIG. 2 a zone IV of two columns is added. Only part of the flow from zone III is directed into the raffinate while the rest is let to pass to zone IV. The flow rate into zone IV is adjusted such low that the cobalt solution does not exit zone IV.

Figure 3:
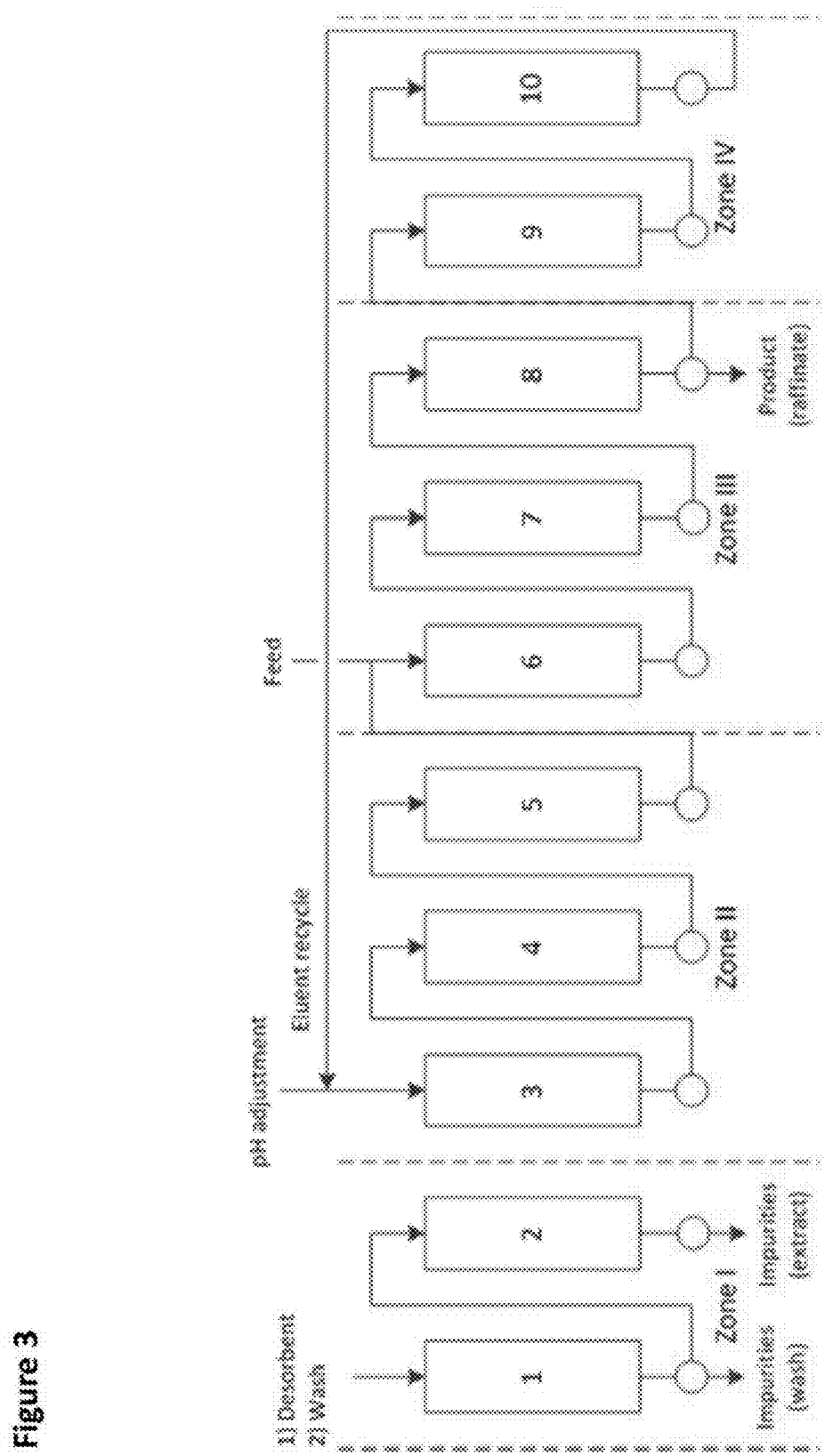
FIG. 3 illustrates an exemplary embodiment of the SMB-process according to the invention.

In an embodiment of the invention depicted in FIG. 3, the outlet stream of zone IV is circulated to the inlet of zone II and used as the eluent, preferably after adjusting its pH.

Naturally it is to be understood that zones can comprise one or more beds and differing number of beds in zones that is presented in figures and examples. Also it should be understood that numbering of zones (zone I, zone II, zone III . . . ) in figures is for simplifying the explanation/description of the embodiments of the invention, and that zone into which a desorbent solution is passed is referred as first zone because of the simplifying the explanation, and that numbering of the zones is not intended for limiting the scope of the claims or the embodiments of the invention. Also it should be understood that the two substeps in regeneration zone (zone I) to regenerate and wash the resin can be conducted sequentially as described here or in parallel in different zones.

In a more detailed description of the SMB process as executed in the first example given below and as depicted in FIG. 1 the first step is as follows: In the first substep 1) of 5 minutes in duration a stream of 2.0 M $H_2SO_4$ is introduced into column 1 and impurity metals selected from: Cd, Mn and Pb, are collected as extract from column 2.

Eluent stream of $H_2SO_4$ adjusted to pH 0.1 is introduced into column 3 and is eluting the adsorbed metals, in particular Co, downstream through interconnected columns 3, 4 and 5. Feed solution of concentrated cobalt sulphate adjusted to pH 0.1 with $H_2SO_4$ is introduced into the inlet of column 6. The feed solution is eluted downstream and passes through the interconnected columns 6, 7 and 8. A diluted Co and Mg containing product is collected from column 8 while other metals are stronger adsorbed into the resin.

In the second substep 2) of 5 minutes in duration a wash solution of $H_2SO_4$ adjusted to pH 0.1 is introduced into the column 1. The $H_2SO_4$ desorbent solution with proton concentration of 4.0 M, previously contained in column 1 and the spent wash solution containing very little impurity metals is collected from column 1. Column 2 containing impurity metals is disconnected from the circuit in this substep. During substep 2) the feed solutions is passed to column 6 and eluent solution to column 3 and eluted through the columns as in substep 1).

After the full step of 10 minutes comprising of the two 5 minute substeps the input and output ports are switched by one increment downstream. Thus, in the first substep 1) of the subsequent full step 2 $H_2SO_4$ with proton concentration of 4.0 M (=2.0M $H_2SO_4$ solution) is introduced into column 2 and impurity metals collected from column 3. Eluent is introduced into column 4 eluting cobalt downstream. After reconnecting columns 8 and 1, Co rich feed solution is introduced into column 7 and then diluted Co and Mg product is collected from column 1 previously regenerated and washed during the full step 1. Each step is timed so that the stronger adsorbing impurity metals are left in the columns in zones II and III and do not travel forward with the liquid flow and thus eventually enter the regeneration zone (zone I).

Example 1

Figure 4:
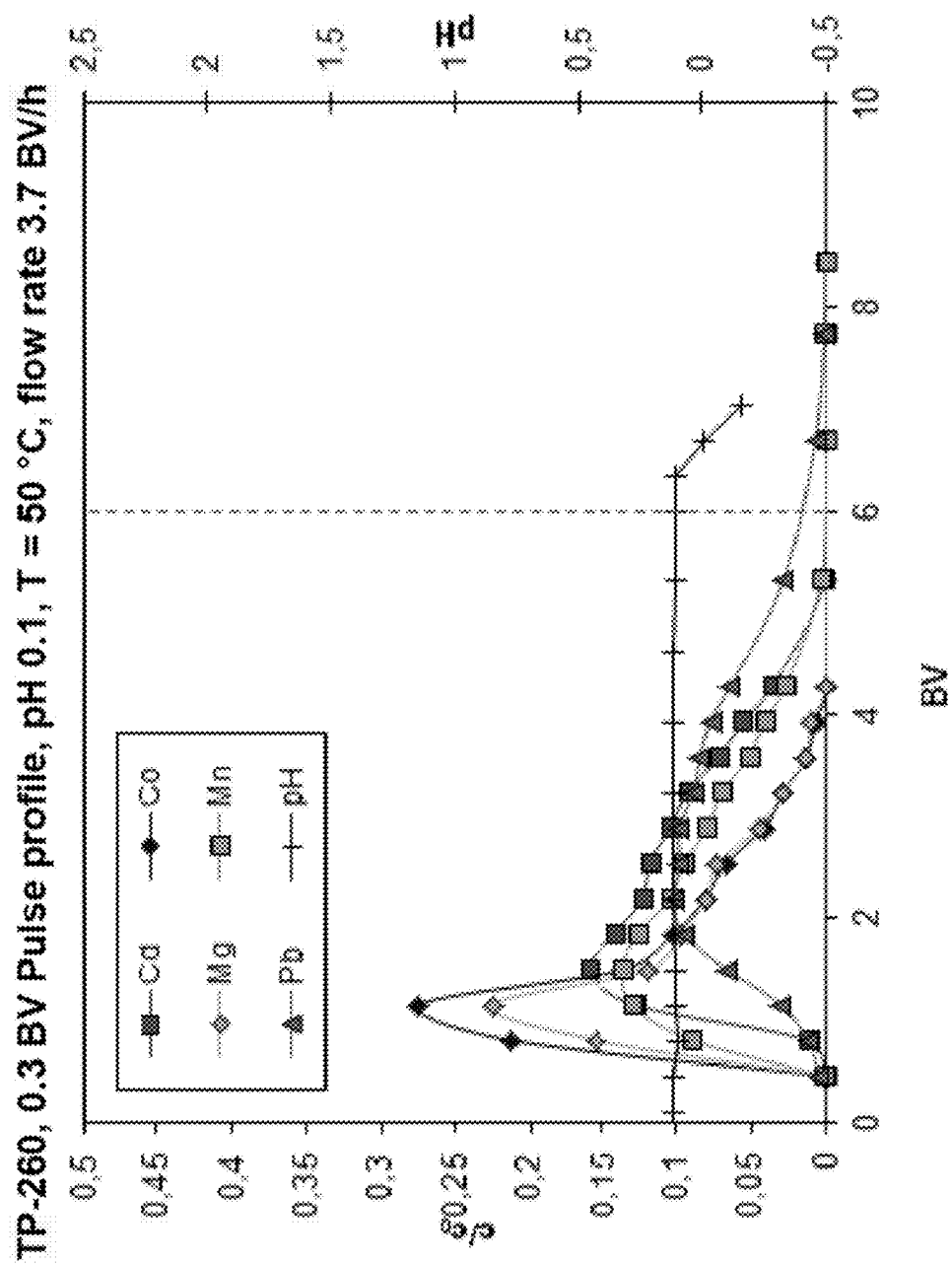
FIG. 4 illustrates ion exchange bed outlet profile of a feed solution in pH 0.1.

In FIG. 4 is shown the ion exchange bed outlet profile of a short pulse of feed solution in pH 0.1 into a single column in batch mode. The composition of the feed is provided in table 1. The ion exchange material is a weakly acidic cation exchange resin with chelating (aminomethyl)phosphonic acid functionality, specifically Lewatit TP-260. In FIG. 4 on the left side of the dashed line is the outlet concentration history of the adsorption, on the right side of the dashed line is the concentration history of desorption with $H_2SO_4$ with proton concentration of 4.0 M (=2.0M $H_2SO_4$ solution). As seen from the graph in FIG. 4 in this pH all metals will elute before introducing the desorption acid.

As seen from FIG. 4 the ion exchange resin used has higher affinity for the impurity metals, whereas Co and Mg are not as strongly adsorbed. Of particular interest for the present invention is the formation of a pronounced Co containing front in the outlet of the column. Optimizing the feed and eluent pH and the internal flow rates in an SMB CIX unit, it is possible to further emphasize this effect to reach nearly 100% purity for cobalt in relation to Cd, Mn and Pb in the product stream.

TABLE 1

| Component | Concentration, mg/L |
| --- | --- |
| Cd | 45 |
| Co | 82 000 |
| Mg | 390 |
| Mn | 110 |
| Pb | 7 |

In the following exemplary embodiment of the invention provided here the feed containing 78 g/L of Co together with Cd (80 mg/L), Mg (350 mg/L), Mn (100 mg/L) and Pb (5 mg/L) is purified using feed and eluent pH of 0.1. The experiment was done in SMB configuration as depicted in FIG. 1, with columns packed with TP-260 ion exchange resin. The impurities are separated from Co and Mg and removed by regeneration from the ion exchange resin in a separate regeneration zone (Zone I) using a desorbent solution of $H_2SO_4$ with proton concentration of 4.0 M (=2.0M $H_2SO_4$), followed by wash solution of $H_2SO_4$ in pH 0.1. In the example provided the impurities are desorbed and the resin washed in the same zone I (see FIG. 1) in subsequent timed substeps 1) and 2) during a full step.

Figure 5:
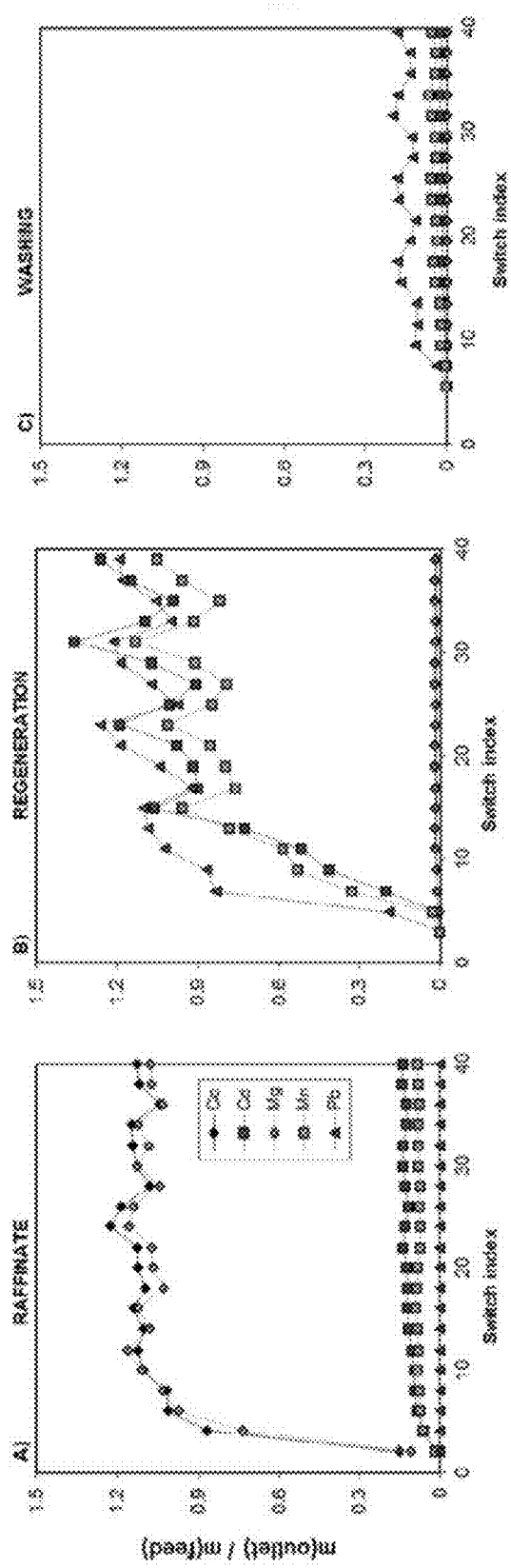
FIGS. 5 A), B), and C) illustrate the amount of metals in each outlet stream for feed solution in pH 0.1.

In FIG. 5 is provided the amount of metals in each outlet stream. The amounts are given in mass of metal relative to mass in feed against the number of the SMB switch. As seen from the charts all Co and Mg are collected in the raffinate (FIG. 5 A), whereas the majority of impurity metals are in regeneration and wash streams (FIG. 5 B-C).

Average concentrations of each metal in the various outlet streams of the SMB CIX system in pH 0.1 when it has reached a steady state are listed in Table 2. As can be seen from FIG. 5 and table 2 cobalt and magnesium are significantly purified. In this present example the concentration of Co in the product is diluted to about 35% of the feed concentration. This is due to the mixing of the eluent of pH 0.1 and the cobalt sulfate feed at the border of zones II and III (see FIG. 1). If an additional zone IV is added downstream of the product collection port (raffinate) as depicted in FIG. 2 the dilution of the product can be decreased by an estimated 20%.

TABLE 2

| | Average concentration in stream, mg/L | | | |
| --- | --- | --- | --- | --- |
| Metal | Feed | Raffinate | Regeneration | Wash |
| Cd | 80 | 3 | 30 | 1 |
| Co | 78000 | 27400 | 458 | 0 |
| Mg | 350 | 119 | 3 | 0 |
| Mn | 100 | 2 | 32 | 2 |
| Pb | 5 | 0 | 2 | 0 |

Example 2

Figure 6:
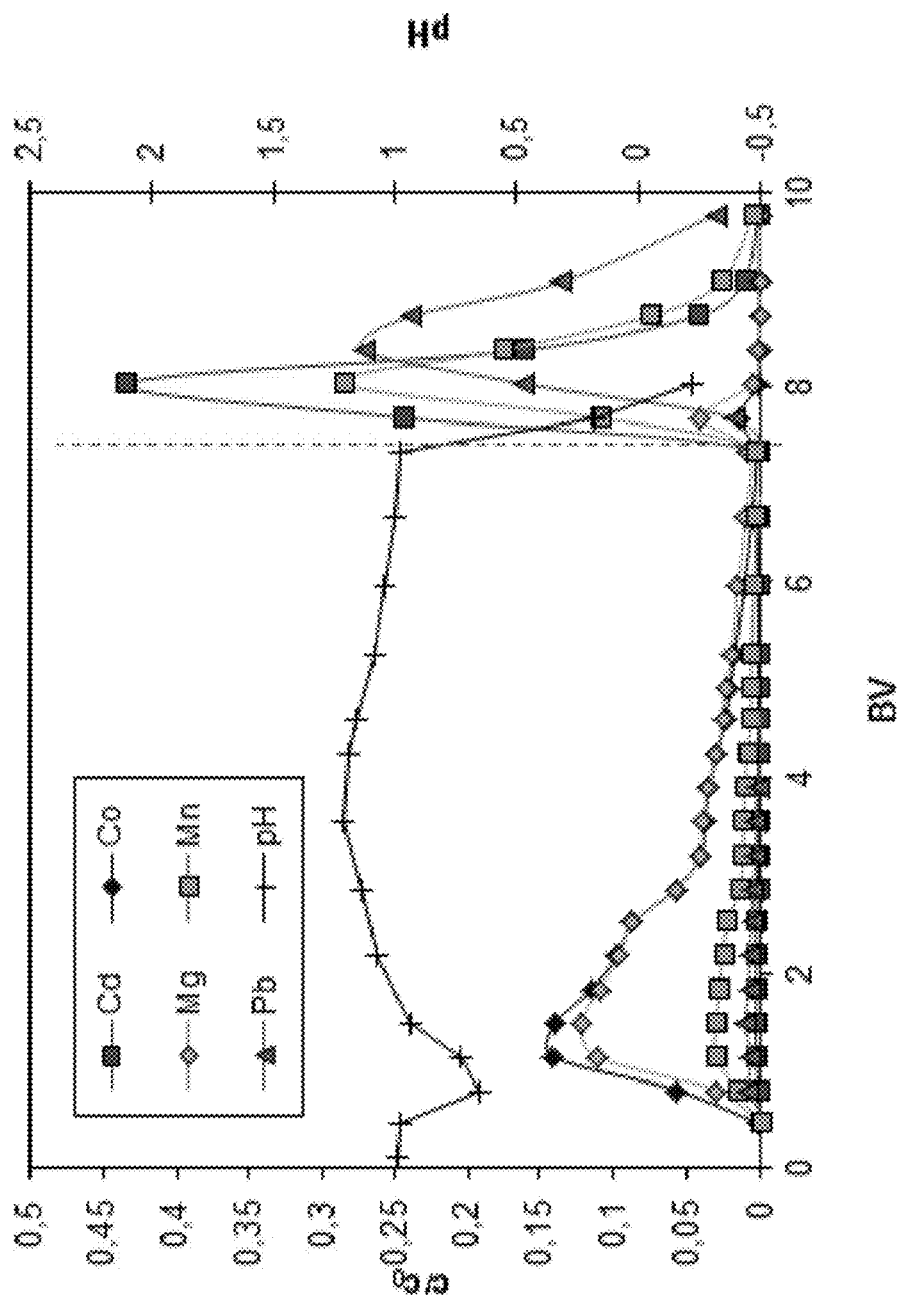
FIG. 6 illustrates ion exchange bed outlet profile of a feed solution in pH 1.0.

In FIG. 6 is shown the ion exchange bed outlet profile of a short pulse of feed solution in pH 1.0 into a single column in batch mode. The composition of the feed is provided in Table 3. The ion exchange material is a weakly acidic cation exchange resin with chelating (aminomethyl)phosphonic acid functionality, specifically Lewatit TP-260. In FIG. 6 on the left side of the dashed line is the outlet concentration history of the column during feeding, on the right side of the dashed line is the concentration history during desorption with $H_2SO_4$ with proton concentration of 4.0 M (=2.0M $H_2SO_4$).

TABLE 3

| Component | Concentration, mg/L |
| --- | --- |
| Cd | 65 |
| Co | 87 000 |
| Mg | 400 |
| Mn | 115 |
| Pb | 8 |

In the following exemplary embodiment of the invention provided here the feed containing 78 g/L of Co together with Cd (80 mg/L), Mg (350 mg/L), Mn (100 mg/L) and Pb (5 mg/L) is purified using feed and eluent pH of 1.0. The experiment was done in SMB configuration as depicted in FIG. 1, with columns packed with TP-260. The impurities are separated from Co and Mg and removed from the ion exchange resin in a separate regeneration zone (Zone I) using a desorbent solution of $H_2SO_4$ with proton concentration of 4.0 M, followed by wash solution of $H_2SO_4$ in pH 1.0. In the example provided the impurities are desorbed and the resin washed in the same zone I (see FIG. 1) in subsequent timed substeps 1) and 2) during a full step.

Figure 7:
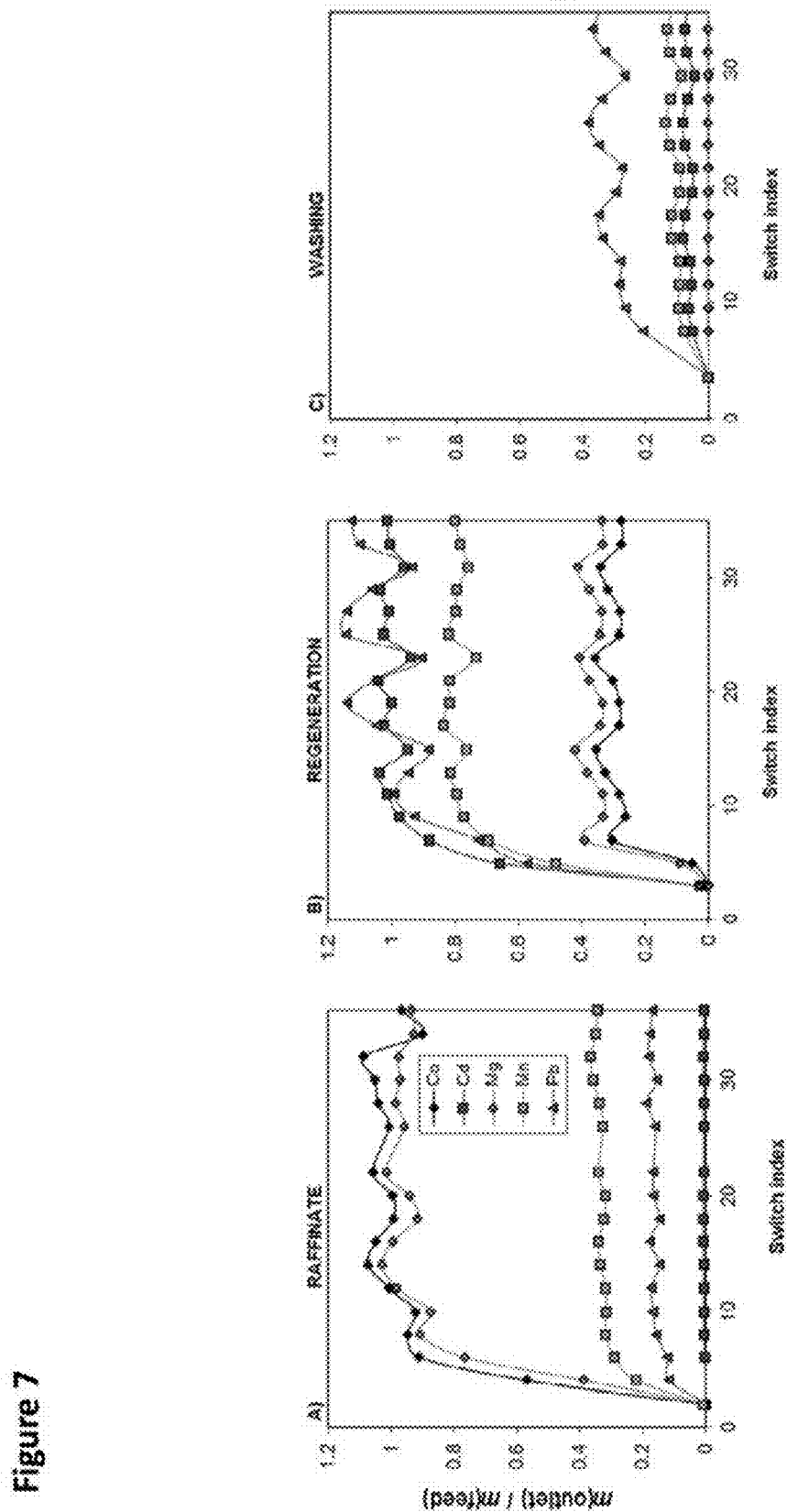
FIGS. 7 A), B), and C) illustrate the amount of metals in each outlet stream for feed solution in pH 1.0.

In FIG. 7 is provided the amount of metals in each outlet stream. The amounts are given in mass of metal relative to mass in feed against the number of the SMB switch. As seen from the charts in this pH the majority Co and Mg report to the raffinate (FIG. 7 A) with more impurity metals than seen in pH 0.1 (FIG. 5 A), whereas the majority of impurity metals are in regeneration and wash streams with some Co and Mg being carried to the regeneration zone (zone I, FIG. 7 B-C).

Average concentrations of each metal in the various outlet streams of the SMB CIX system in pH 1.0 when it has reached a steady state are listed in table 4. As can be seen from FIG. 7 and table 4 cobalt and magnesium are purified, albeit to a lesser extent as seen in pH 0.1. In this present example the concentration of Co in the product is diluted to about 30% of the feed concentration.

TABLE 4

| Metal | Average concentration in stream, mg/L | | | |
|---|---|---|---|---|
| | Feed | Raffinate | Regeneration | Wash |
| Cd | 80 | 0 | 28 | 2 |
| Co | 78000 | 24600 | 8300 | 0 |
| Mg | 350 | 105 | 45 | 0 |
| Mn | 100 | 11 | 28 | 4 |
| Pb | 5 | 0 | 2 | 1 |

Reference Example 3

Figure 8:
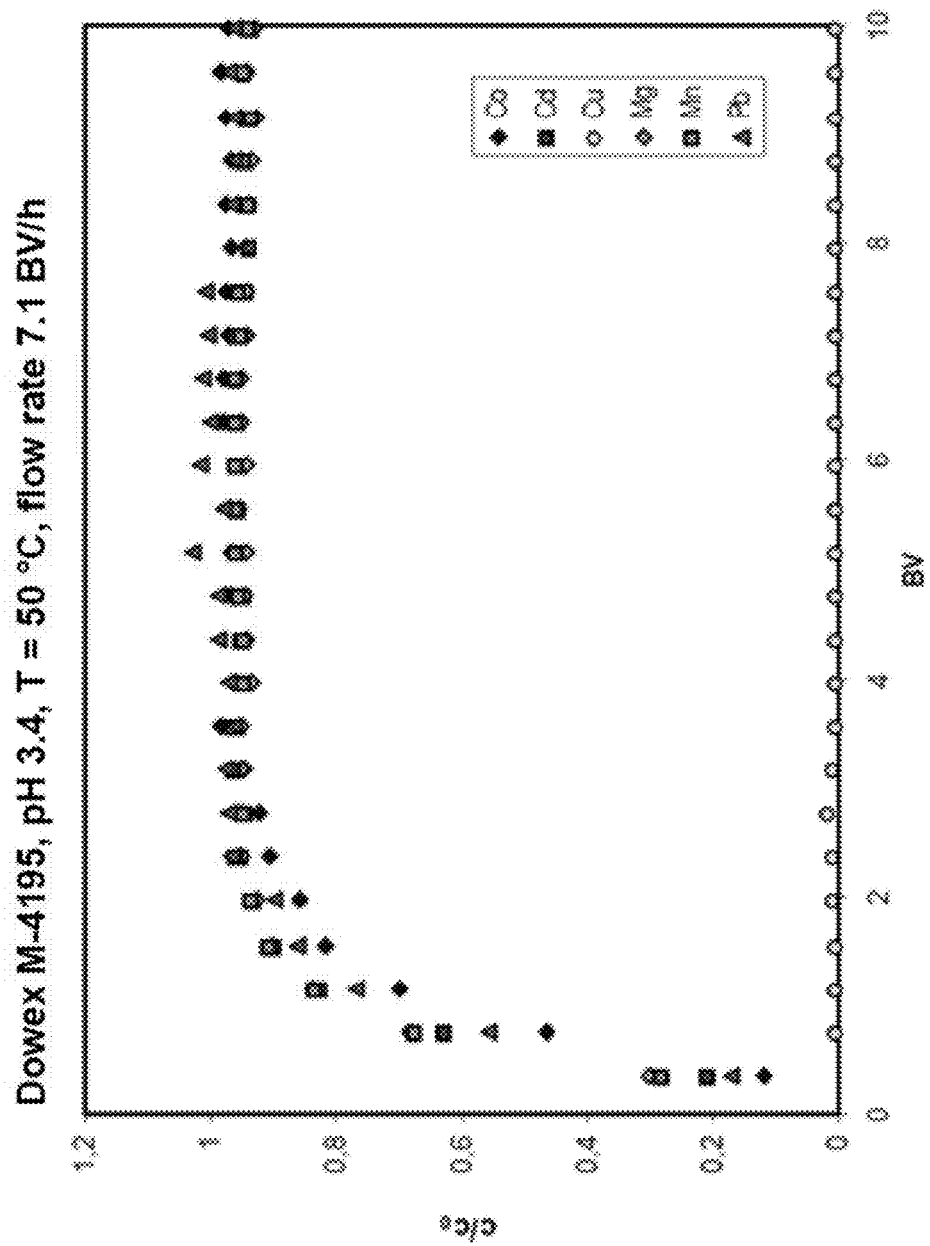
FIG. 8 illustrates a reference curve for metals recovery from hydrometallurgical process solution using prior-art process solution.

This example is provided here only as a reference in support of the background of the invention. In FIG. 8 is provided a breakthrough curve for metals recovery in a single column in batch mode from a synthetic hydrometallurgic process solution using a bis-2-(pyridylmethyl)amine functional resin. The feed solution composition is listed in table 5. The pH of the solution is 3.4 and the counter ion for metal cations is sulfate. As seen from the curve in FIG. 8 a bis-2-(pyridylmethyl)amine functional ion exchange resin, specifically Dowex M-4195, is incapable of purifying Co from impurity metals in the present solution. This confirms that the methods described in WO 2011/100442 and WO 2013/165735 using Dowex M-4195 are not applicable to purification of such concentrated cobalt sulfate solutions as considered in the present invention because no separation is achieved.

TABLE 5

| Component | Concentration, mg/L |
|---|---|
| Cd | 100 |
| Co | 100 000 |
| Cu | 100 |
| Mg | 500 |
| Mn | 100 |
| Pb | 20 |

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. A method for purification of a cobalt containing feed solution from impurity metals by processing the feed solution through a continuous counter-current ion exchange process comprising of several beds containing weakly acidic cation exchange resin with chelating (aminomethyl)phosphonic acid functionality arranged in interconnectable zones 1, 2, 3-N in a simulated counter-current moving bed arrangement, wherein each bed is interconnectable with two adjacent beds, the method comprising:
   (a) introducing a desorbent solution, which has sufficiently low pH that impurity metals are desorbed, into one or more beds of the first, regeneration zone (zone I) and collecting an extract containing impurity metals from the same bed and/or from another bed downstream within the said regeneration zone,
   (b) introducing a wash solution of pH higher than the desorbent solution into one or more of said beds of the regeneration zone and collecting an extract containing impurity metals and desorbent from the said bed and/or from another beds downstream within the first, regeneration zone,
   (c) introducing an aqueous eluent of pH sufficiently low to desorb Co but sufficiently high not to desorb impurity metals into one or more beds of zone downstream (zone II) to said regeneration zone,
   (d) introducing the cobalt containing feed solution, which has pH sufficiently high to adsorb impurity metals but sufficiently low to avoid adsorbing Co, into one or more beds of the next zone downstream (zone III) from the zone of step (c) and collecting a cobalt product raffinate solution from the said bed and/or from another beds downstream,
   wherein the positions where the cobalt containing feed, eluent, desorbent, and wash solution are introduced and where the impurity metals containing extract, spent wash solution, and cobalt containing raffinate are collected are changed to adjacent beds downstream to simulate the counter-current flow of the solid and liquid phases after such periods of time that cobalt propagates downstream with fluid phase in zones II and III, impurity metals propagate upstream with the simulated flow of the solid phase in zones II and III, impurity metals are desorbed in zone I, and the desorbent is washed from the resin in zone I.

2. The method of claim 1, further comprising:
   (e) passing part of the cobalt raffinate product solution to a zone IV consisting of one or more said beds downstream of the cobalt raffinate outlet to recover eluent and reduce dilution of product.

3. The method of claim 1, further comprising recycling the recovered eluent to be used as eluent.

4. The method of claim 1, wherein the concentration of cobalt in the cobalt containing feed solution is from 10 g/L to a saturated solution.

5. The method of claim 1, wherein the cobalt exists as cobalt sulfate.

6. The method of claim 1, wherein the desorbent is a solution of a inorganic acid, such as HCl, $H_2SO_4$, $H_3PO_4$ and $HNO_3$, with proton concentration below 6.0 M.

7. The method of claim 1, wherein the eluent is a solution of a inorganic acid with pH in the range 2.0 to 0.

8. The method of claim 1, wherein the wash solution contains an inorganic acid with pH same or below that of the feed solution.

9. The method of claim 1, wherein the steps (a) and (b) are carried out in beds disconnected from other beds.

10. The method of claim 1, wherein the ion exchange beds are in stationary columns and the liquid inlet and outlet streams are periodically advanced by one column increment in the direction of the liquid flow.

11. The method of claim 1, wherein the ion exchange beds are in moving columns and the columns are periodically moved by one bed increment relative to stationary liquid feed and outlet ports in the opposite direction of the liquid flow.

12. The method of claim 1, wherein the steps (a) and (b) are operated in the same beds in alternating time controlled substeps.

13. The method of claim 1, wherein the impurity metals extracted from cobalt containing solution comprise at least one or more of the following: Cd, Mn, Mg, Pb, Cu, Zn, U, Ca, Fe, Ni, Cr, Na, and/or Al.

14. The method of claim 1, wherein regeneration zone is disconnected from other zones.

15. The method of claim 1, wherein each zone includes 1-4 interconnected beds.

16. The method of claim 1, wherein each zone includes 2-3 interconnected beds.

* * * * *